United States Patent [19]
Gottstein et al.

[11] 3,714,146
[45] Jan. 30, 1973

[54] NOVEL SYNTHESES OF CEPHALEXIN AND INTERMEDIATES THEREFOR

[75] Inventors: William J. Gottstein; Lee C. Cheney, both of Fayetteville, N.Y.

[73] Assignee: Bristol-Meyers Company, New York, N.Y.

[22] Filed: Oct. 5, 1970

[21] Appl. No.: 78,165

Related U.S. Application Data

[63] Continuation-in-part of Ser. No. 27,441, April 10, 1970.

[52] U.S. Cl............260/239.1, 260/243 C, 424/271, 424/246
[51] Int. Cl. .....................C07d 99/16, C07d 99/24
[58] Field of Search.....................260/239.1, 243 C

[56] References Cited

UNITED STATES PATENTS

| | | |
|---|---|---|
| 3,464,985 | 9/1969 | Holdrege..........................260/243 C |
| 3,489,750 | 1/1970 | Crast...............................260/243 C |
| 3,489,751 | 1/1970 | Crast...............................260/243 C |
| 3,489,752 | 1/1970 | Crast...............................260/243 C |

*Primary Examiner*—Nicholas S. Rizzo
*Attorney*—Herbert W. Taylor, Jr., Robert E. Havranek, Richard H. Brink and James Magee, Jr.

[57] ABSTRACT

The antibacterial agent cephalexin is prepared from readily available hetacillin by the consecutive steps of nitrosation or formylation to give N-nitroso- or N-formyl-hetacillin, oxidation as with $NaIO_4$ below pH 5 to give the corresponding sulfoxide, rearrangement by heat, preferably with acid present, to give N-nitroso- or N-formylhetacephalexin and finally cleavage to give cephalexin as by zinc and acetic acid or Raney nickel and hydrogen or, preferably, hydrogen chloride in dioxane.

8 Claims, No Drawings

NOVEL SYNTHESES OF CEPHALEXIN AND INTERMEDIATES THEREFOR

CROSS-REFERENCE TO RELATED APPLICATION

This application is a continuation-in-part of my prior, copending application, Ser. No. 27,441 filed Apr. 10, 1970.

BACKGROUND OF THE INVENTION

1. Field of the Invention

This invention includes new processes for the production of the antibacterial agent cephalexin and certain novel chemical intermediates derived from hetacillin and used in those processes.

2. Description of the Prior Art

Applicants' starting material, hetacillin, is a well-known antibacterial agent derived from 6-aminopenicillanic acid (6-APA) and described, for example, in U.S. Pat. No. 3,198,804, and J. Org. Chem. 31, 897 (1966). Applicants' final product, cephalexin, is an antibacterial agent derived from 7-desacetoxycephalosporanic acid (7-ADCA) and described, for example, in J. Med. Chem., 12, 310-313 (1969), in Great Britain 1,174,335, in South Africa 67/1260 (Farmdoc 28,654), in Japan 16871/66 (Farmdoc 23231), in Belgium 696,026 (Farmdoc 29494).

The conversion of a penicillin sulfoxide ester (by heating in the presence of a strong acid) to the corresponding ester of a similarly N-acylated derivative of 7-ADCA has been reported in U.S. Pat. No. 3,275,626 and in J. Amer. Chem. Soc., 85, 1896 (1963) and 91(6), 1401-1407 (1969). Variations of this process are given in Netherlands 68/06532 (Farmdoc 34,685) and Netherlands 68/06533 (Farmdoc 34,686). In those patents the side-chain is usually that of a fermentable penicillin such as penicillin G or V (although see Column 7 of U.S. Pat. No. 3,275,626) and the product is an ester which must be cleaved, as by hydrogenation, to produce the active, free acid form of the final derivative of 7-ADCA. Great Britain 1,174,335 in Example 3 describes the application of this "sulfoxide rearrangement" to an ester of ampicillin sulfoxide in which the α-amino group is also blocked, that is, 6-[N-(2,2,2-trichloro-ethylcarbonyl-D-α-amino-α-phenylacetamido]penicillanic acid sulfoxide 2,2,2-trichloroethyl ester, by heating and then use of zinc and acetic acid to remove the two blocking groups and thus produce cephalexin.

The art contains numerous additional descriptions of penicillin sulfoxides and their preparation, as described for example, by Chow et al., J. Org. Chem, 27, 1381 (1962), by Guddal et al., Tetrahedron Letters No. 9, 381 (1962), by Essery et al., J. Org. Chem., 30, 4388 (1965) who included ampicillin sulfoxide, and in U.S. Pat. No. 3,197,466.

The reaction product of acetone with cephaloglycin, but not with cephalexin, is described in U.S. Pat. No. 3,303,193. The reaction with acetone of certain ring-substituted cephalexins is described in general terms in U.S. Pat. Nos. 3,489,750, 3,489,751 and 3,489,752.

Deficiencies of these processes when applied to the production of cephalexin include the need to conduct a series of reactions to replace the original side-chain when a fermented penicillin, e.g., penicillin V, is used as the starting material, and the need when starting with the desired side-chain (α-aminobenzyl) to first introduce and later remove blocking groups for both the α-amino group and the carboxyl group.

SUMMARY OF THE INVENTION

The present invention includes, but is not limited to, the novel intermediates (I, II, III and IV below) and the separate processes (A through G below) which may be summarized as follows:

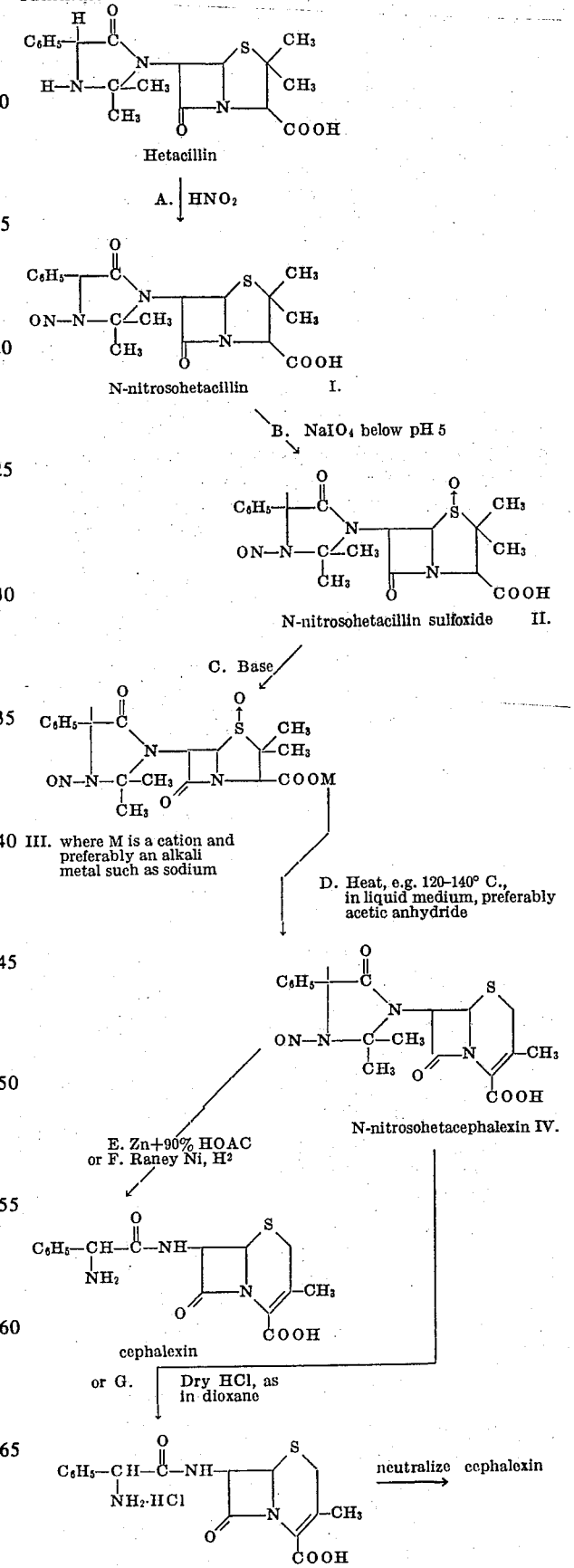

Hetacillin

A. ↓ HNO₂

N-nitrosohetacillin  I.

B. NaIO₄ below pH 5

N-nitrosohetacillin sulfoxide  II.

C. Base

III. where M is a cation and preferably an alkali metal such as sodium

D. Heat, e.g. 120-140° C., in liquid medium, preferably acetic anhydride

N-nitrosohetacephalexin IV.

E. Zn+90% HOAC
or F. Raney Ni, H₂ cephalexin or G. Dry HCl, as in dioxane neutralize cephalexin →

As illustrated in the Examples below, the N-nitroso group can be replaced by an N-formyl group to give novel intermediates and processes which also form a part of this invention.

In reaction B it was found necessary to keep the reaction mixture below pH 5 to prevent, or at least minimize, C-6 epimerization.

The conversion of N-nitrosohetacillin sulfoxide to N-nitroso-hetacephalexin can be conducted in various ways. Thus, the carboxyl group can be blocked (in a manner which facilitates later removal) with a silyl group, e.g. from dichlorodimethylsilane or the like, or as a mixed anhydride, e.g. from acetyl chloride, but it was most surprising to find that the conversion was highly efficient with no blocking group at all on the carboxyl group. Useful reaction conditions include heating to 120°–140° C. for at least one hour in a solvent such as acetic anhydride or tetramethylurea. An acid catalyst is essential, e.g. p-toluenesulfonic acid or acetic anhydride.

The procedures set forth herein thus provide an improved process for the preparation of the valuable antibacterial agent cephalexin as noted above and completely avoid the numerous steps necessary when the cephalosporin nucleus is obtained originally by direct fermentation of cephalosporin C followed by removal of the side-chain, reacylation and, at some point, hydrogenation of 3-acetoxymethyl to 3-methyl.

The following examples will serve to illustrate this invention without limiting it thereto. All temperatures are given in degrees Centigrade. "Skellysolve B" is a petroleum ether fraction of B.P. 60°–68° C. consisting essentially of n-hexane.

DESCRIPTION OF THE PREFERRED EMBODIMENTS

EXAMPLE 1

6-(D-2,2-Dimethyl-3-nitroso-5-oxo-4-phenyl-1imidazolidinyl)-penicillanic acid (N-nitrosohetacillin)

To a suspension of 7.1 g. (0.02 mole) of hetacillin in 350 ml. of water was added at room temperature 6 N hydrochloric acid dropwise until all of the hetacillin had dissolved. The solution was cooled in an ice-bath at 10° and layered with 100 ml. of ethyl acetate. A total of 1.4 g. (0.02 mole) of sodium nitrite dissolved in 25 ml. of water was added in small portions over a five minute period. The solution was stirred for 20 minutes at 10° and the ethyl acetate layer was separated, washed with water and evaporated at 5° under reduced pressure (15 mm) to a yellow oil which crystallized after slurrying with ether. The product was recrystallized from methanol-water to yield 4.5 g. of crystals (54% yield); m.p. 195° (decompn.) Anal. Calcd. for $C_{19}H_{24}N_4O_5S$: C, 54.54; H, 5.30; N, 13.39. Found: C, 54.55; H, 5.58; N, 13.33.

Ir (KBr) 2800 to 3600 cm.$^{-1}$ (carboxyl OH), 1803 and 1790 ($\beta$ lactam $\overset{O}{\overset{\|}{C}}$—N), 1750 and 1730 (carboxyl $\overset{O}{\overset{\|}{C}}$ and imidazolidinone $\overset{O}{\overset{\|}{C}}$—N), 700 ($C_6H_5$—); nmr. (DMSO d$_6$), 7.30 p.p.m. $\delta$ (S, 5, $C_6H_5$—), 5.64 (S, 1, $\rangle$—CH—N), 5.60 (d, 1, J=4 cps., NCHCO), 5.45 (d, 1, J=4 cps. NCHS), 435 (S, 1, NCHCO), 2.00 (S, 6, CH$_3$CH$_3$CN), 1.48 (S, 6, CH$_3$CH$_3$CS).

EXAMPLE 2

6-(D-2,2-Dimethyl-3-nitroso-5-oxo-4-phenyl-1imidazolidinyl)-penicillanic acid sulfoxide (N-nitrosohetacillin sulfoxide)

A total of 10 g. (0.024 mole) 6-(D-2,2-dimethyl-3-nitroso-5-oxo-4-phenyl-1imidazolidinyl) penicillanic acid was dissolved in 100 ml. of water at pH 8 by the dropwise addition of 10 percent sodium hydroxide. After cooling to 0° a solution of 6 g. (0.025 mole) of sodium metaperiodate was added in 100 ml. of water and stirring was continued for 3 hours. The pH of the solution was lowered to 2 with 1:1 phosphoric acid. The product was extracted into ethyl acetate, washed with water and the solution was azeotroped to an oil which, on slurrying with ether, crystallized to yield 6.5 g. of white crystals; m.p. >160° (slow decompn.). An analytical sample was recrystallized from dimethyl-formamide and water. Anal. Calcd. for $C_{19}H_{22}N_4O_6S$: C, 52.52; H, 5.11; N, 12.92. Found: C, 52.66; H, 5.37; N, 13.45.

Ir (KBr) 3540 cm.$^{-1}$ (hydrate OH), 2400 to 3400 (carboxy OH), 1804 ($\beta$ lactam $\overset{O}{\overset{\|}{C}}$—N), 1720 to 1750 (imidazolidinone $\overset{O}{\overset{\|}{C}}$—N and carboxyl $\overset{O}{\overset{\|}{C}}$), 1050 (S→O), 705 ($C_6H_5$—); nmr. (DMSO d$_6$), 7.32 p.p.m. $\delta$ (S 5, $C_6H_5$—), 5.77 (S, 1, $\rangle$—CH—N), 5.72 (d, 1, J=4.5 cps. NCHCO), 4.83 (d, 1, J=4.5 cps., NCHS), 4.30 (S, 1, NCHCO), 2.12 and 2.05 (S, S, 6 CH$_3$CH$_3$CN), 1.47 and 1.20 (S, S, 3, 3, CH$_3$CH$_3$CS).

EXAMPLE 3

Rearrangement of 6-(D-2,2-Dimethyl-3-nitroso-5oxo-4-phenyl-1-imidazolidinyl) penicillanic acid sulfoxide (N-nitrosohetacillin sulfoxide) to N-nitrosohetacephalexin To a stirred solution of 2 g. (0.0048 mole) of N-nitrosohetacillin sulfoxide dissolved in 100 ml. of tetrahydro-furan was added 0.5 g. (0.0050 mole) of triethylamine. The triethylammonium salt precipitated and 320 mg. (0.0023 mole) of dichlorodimethylsilane was added to the slurry which cleared appreciably after a few minutes. Stirring was continued for 45 minutes. The triethylammonium chloride was removed by filtration and the tetrahydrofuran was evaporated under reduced pressure to an oily light yellow residue which was dissolved in 100 ml. of tetramethylurea and 3 g. of acetic anhydride. The flask was flushed with nitrogen and the solution was heated for 1 hour at 130°. The tetramethylurea was removed at 35° at 0.1 mm. and the residue was dissolved in ethyl acetate and extracted with dilute sodium carbonate solution at pH 8.5. The basic solution was separated and the pH was lowered to 2 with 1:1 phosphoric acid and the precipitate was extracted into ethyl acetate, washed with water and dried by azeotropic distillation to give N-nitrosohetacephalexin as a solid which weighed 470 mg. A bioautograph of this solid (against a B. subtilis-seeded agar plate) of a cellulose plate developed with n-butanol, ethanol and water (4:1:5) showed a biologically active spot corresponding exactly in R$_f$ value with that of authentic N-nitrosohetacephalexin. Both samples were resistant to penicillinase.

EXAMPLE 4

7-(D-2,2-Dimethyl-3-nitroso-5-oxo-4-phenyl-1-imidazolidinyl)-3-methyl-3-cephem-4-carboxylic acid (N-nitrosohetacephalexin) from cephalexin To a mixture of 10 g. (0.03 mole) of (7-D-$\alpha$-aminophenylacetamido)-3-methyl-3-cephem-4-carboxylic acid (cephalexin) in 100 ml. of water was added 10 percent sodium hydroxide solution until a pH of 8.8 was attained. To this solution was added 40 ml. of acetone and the reaction was stored overnight. The solvent was evaporated leaving behind hetacephalexin as a frothy amorphous solid which was dissolved in 200 ml. of water and acidified to pH 2 with 6 N hydrochloric acid layered with 200 ml. of ethyl acetate. The solution was cooled in an ice-bath to 5° and 1.6 g. (0.024 mole) of sodium nitrite was added. After stirring for one-half hour the ethyl acetate was separated, washed with water and evaporated under reduced pressure to an oil. The oil solidified on slurrying with ether to give 2.5 g. of N-nitrosohetacephalexin as an amorphous solid. During storage overnight a second crop separated which was crystalline and weighed 1.2 g. The crops were combined and recrystallized from ethyl acetate and ether. Yield 3.2 g. The analytical sample was recrystallized from boiling methanol, mp. 158°–160°. Anal. Calcd. for $C_{19}H_{20}N_4O_5S$. ½ $H_2O$ C, 53.73; H, 4.74; N, 13.17. Found: C, 53.90; H, 4.96: N, 13.48.

Ir (KBr) 2500 to 3500 cm.$^{-1}$ (carboxyl-OH), 1780 ($\beta$ lactam-$\overset{O}{\underset{\|}{C}}$—N), 1720 and 1730 (imidazolidinone—$\overset{O}{\underset{\|}{C}}$—N and carboxyl $\overset{O}{\underset{\|}{C}}$), 700 ($C_6H_5$—);

nmr. (DMSO $d_6$), 7.31 p.p.m. $\delta$ (S, 5, $C_6\underline{H}_5$—), 5.68 (S, 1, ⟩—C$\underline{H}$—N), 5.55 (d, 1, J=4.5 cps., NC$\underline{H}$CO), 5.15 (d, 1, J=4.5 cps., NC$\underline{H}$S), 2.9 to 3.6 (m, 2, SC$\underline{H}_2$—⟨), 1.8 to 2.3 (m, 9, C$\underline{H}_3$C$\underline{H}_3$CN and C$\underline{H}_3$—⟨).

EXAMPLE 5

7-(D-α-Aminophenylacetamido)-3-methyl-3-cephem-4-carboxylic acid by Zinc and Acetic acid Reduction of N-nitrosohetacephalexin To 500 mg. of 7-(D-2,2-dimethyl-3-nitroso-5-oxo-4-phenyl-1-imidazolidinyl)-3-methyl-3-cephem-4-carboxylic acid dissolved in 20 ml. of 90 percent acetic acid was added 500 mg. of zinc dust. The mixture was stirred at 5° in an ice-bath for 3 hours. The zinc was collected by filtration and the filtrate was evaporated at 0.1 mm to an oil which was slurried with ether and solidified to yield 420 mg. The ir spectrum showed a β-lactam at 1755 $^{cm-1}$, amide carbonyl at 1695 $^{cm-1}$ and a strong carboxylate at 1580 $^{cm-1}$. The bioautogram of this solid (against a *B. subtilis*-seeded agar plate) of paper strip What. No. 1 in a n-butanol, ethanol, water (4:1:5) system showed a biologically active spot corresponding in a $R_f$ value with that of authentic 7-(D-α-amino-phenylacetamido)-3-methyl-3-cephem-4-carboxylic acid (cephalexin). The 420 mg. was further purified by dissolving it in 7 ml. of water at pH 8 by the addition of NaSH. The zinc sulfide was collected and the filtrate evaporated to an oil which solidified to yield 31 mg. The infrared spectrum was identical with the spectrum of authentic cephalexin.

EXAMPLE 6

7-(D-α-Aminophenylacetamido)-3-methyl-3-cephem-4-carboxylic acid by Thermal Rearrangement of N-nitrosohetacillin followed by Zn-HOAC cleavage To 2 g. (0.0048 mole) of 6-(D-2,2-dimethyl-3-nitroso-5-oxo-4-phenyl-1-imidazolidinyl) penicillanic acid sulfoxide dissolved in 150 ml. of tetrahydrofuran was added 0.5 g. (0.0050 mole) of triethylamine and 0.32 g. (0.0025 mole) of dichlorodimethylsilane. The mixture was stirred for one-half hour and filtered. The filtrate was evaporated under reduced pressure to an oil which was dissolved in 100 ml. of tetramethylurea and 10 ml. of acetic anhydride. The solution was heated to 120°–122° for 1 hour. The tetramethylurea was evaporated at 35° at 0.1 mm. to a dark brown oil which was dissolved in ethyl acetate and extracted at pH 7-8 with dilute sodium carbonate solution. The aqueous solution was separated, washed with ether, acidified to pH 2 with 1:1 phosphoric acid, and extracted into ethyl acetate. The ethyl acetate was evaporated under reduced pressure and the oily residue of N-nitrosohetacephalexin was dissolved in 30 ml. of 90 percent acetic acid and stirred for 2 hours at 10° with 2 g. of zinc dust. The zinc was collected by filtration and the filtrate was evaporated at 30° at 0.1 mm. to an oil which solidified by slurrying with dry ether to yield 470 mg. cephalexin. Its paper chromatogram (What. No. 1) against a *B. subtilis*-seeded agar plate developed with n-butanol, ethanol and water (4:1:5) showed zone of inhibition corresponding exactly in $R_f$ value to that of authentic 7-(D-α-aminophenylacetamido)-3-methyl-3-cephem-4-carboxylic acid (cephalexin).

EXAMPLE 7

Hydrogenolysis of 7-(D-2,2-Dimethyl-3-nitroso-5-oxo-4-phenyl-1-imidazolidinyl)-3-methyl-3-cephem-4-carboxylic acid by Raney nickel to give cephalexin A suspension of 1 g. (0.0024 mole) of 7-(D-2,2-dimethyl-3-nitroso-5-oxo-4-phenyl-1-imidazolidinyl)-3-methyl-3-cephem-4-carboxylic acid and 1 g. of wet Raney nickel No. 28 was shaken for 2 days under 50 p.s.i. of hydrogen. After 1 day 2 more grams of catalyst was added in 25 ml. of water. After 2.5 equivalents of hydrogen were taken up the nickel was removed by filtration and the solution was adjusted to pH 2 with 2 N hydrochloric acid. The mixture was filtered and the filtrate was adjusted to pH 4.7 with 10 percent sodium hydroxide and evaporated at 35° at 0.1 mm. to give cephalexin as a white solid which weighed 0.6 g. A paper chromatogram of this solid (against a B. subtilis-seeded agar plate) (What. No. 1) developed with n-butanol, ethanol, and water 4:1:5 showed a zone of inhibition corresponding exactly in $R_f$ value to that of authentic cephalexin.

EXAMPLE 8

6-(2,2-Dimethyl-3-formyl-5-oxo-4-phenyl-1-imidazolidinyl) penicillanic acid (N-formylhetacillin)

To a solution of 25 g. (0.06 mole) of hetacillin in 50 ml. of 97 percent formic acid was added 15 ml. of acetic anhydride. The solution was stirred for 15 minutes and the temperature rose to ca. 40°. The solution was diluted with 100 ml. of water and the white crystalline solid was collected and air dried overnight. The yield was 22 g. mp. 210°–215° decompn. Anal. Calcd. for $C_{20}H_{22}N_3O_5S$: C, 57.53; H, 5.55; N, 10.06. Found: C, 57.20; H, 5.85; N, 10.04.

EXAMPLE 9

6-(D, 2,2-Dimethyl-3-formyl-5-oxo-4-phenyl-1-imidazolidinyl)-penicillanic acid sulfoxide (N-formylhetacillin sulfoxide)

To 12 g. (0.024 mole) of N-formylhetacillin dissolved in 250 ml. of water at pH 8 (10% NaOH solution) was added 6.2 g. (0.03 mole) sodium metaperiodate. The solution was stirred for 3 hours at room temperature and then acidified to pH 2 with 1:1 phosphoric acid. The product was collected, washed with water and air dried overnight to yield 3.5 g. of the sulfoxide, mp. 210–215 decompn. After recrystallization from dimethylformamide and water, the analytical sample was dried in vacuo over $P_2O_5$ at 56°. Anal. Calcd. for $C_{20}H_{23}N_3O_6S$. ½ $H_2O$: C, 54.30; H, 5.25; N, 9.51. Found: C, 54.01; H, 5.44; N, 9.99.

EXAMPLE 10

Rearrangement of 6-(2,2-Dimethyl-3-formyl-5-oxo-4-phenyl-1-imidazolidinyl)penicillanic acid sulfoxide to N-formylhetacephalexin.

To a solution of 2 g. (0.0047 mole) of 6-(2,2-dimethyl-3-formyl-5-oxo-4-phenyl-1-imidazolidinyl)penicillanic acid sulfoxide in 100 ml. of tetrahydrofuran was added 0.48 g. (0.0048 mole) of triethylamine. After stirring at room temperature for 15 minutes 0.52 g. (0.0048 mole) trimethylsilyl chloride was added and a precipitate of triethylammonium chloride was observed after a few minutes. The stirring was continued for 15 minutes and the salt was removed by filtration and discarded. The tetrahydrofuran was evaporated under reduced pressure (15 mm) leaving a gummy residue which was dissolved in 35 ml. of tetramethylurea and 3 g. of acetic anhydride. The solution was heated at 131° for 1 hour. The tetramethylurea was removed by distillation at 0.1 mm at 35° and the residue was dissolved in ethyl acetate and extracted at pH 8.5 with sodium carbonate solution. The aqueous layer was separated, washed with ethyl acetate and acidified to pH 2 with 1:1 phosphoric acid. The mixture was then extracted 2x with ethyl acetate, washed with water and evaporated at 35° at 10 mm. The residue was dissolved in 15 ml. of methanol and treated with charcoal (Darko KB). The charcoal was removed by filtration and the methanol was diluted with water and stored overnight. A yellow solid was collected and weighed 120 mg. The sample was slurried with ethyl acetate to give 22 mg. of N-formylhetacephalexin as a light yellow solid. The ir spectrum was identical to the spectrum of authentic 7-(2,2-dimethyl-3-formyl-5-oxo-4-phenyl-1-imidazolidinyl)-3-methyl-3-cephem-4-carboxylic acid prepared by an alternate procedure. The bioautogram of this solid (against B. subtilis-seeded agar plate) on a paper strip What. No. 1 paper in a n-butanol, ethanol, water system (4:1:5) showed a biologically active spot corresponding exactly in $R_f$ value to that of the authentic specimen.

EXAMPLE 11

7-(2,2-Dimethyl-3-formyl-5-oxo-4-phenyl-1-imidazolidinyl)-3-methyl-3-cephem-4-carboxylic acid from cephalexin To 5 g. (0.014 mole) of cephalexin suspended in 50 ml. of water was added dropwise 10% NaOH to pH 8.8. The solution was diluted with 20 ml. of acetone and stored at 10° overnight. The water was evaporated at 0.1 mm at 35° on a rotary evaporator to an amorphous yellow powder which was dissolved in 15 ml. of 97 percent formic acid. After addition of 5 ml. of acetic anhydride the solution was stored for 15 minutes at room temperature and diluted with 30 ml. of water. White crystals were collected and air dried to yield 700 mg., mp> 240° decompn. Anal. Calcd. for $C_{20}H_{21}N_3O_5S.H_2$; c, 55.60; H, 5.34; N, 9.75; Found: C, 55.43; H, 5.46; N, 10.31.

EXAMPLE 12

Acid Hydrolysis of 7-(2,2-Dimethyl-3-formyl-5-oxo-4-phenyl-1-imidazolidinyl)-3-methyl-3-cephem-4-carboxylic acid to cephalexin To a solution of 415 mg. (0.001 mole) of 7-(2,2-dimethyl-3-formyl-5-oxo-4-phenyl-1-imidazolidinyl)-3-methyl-3-cephem-4-carboxylic acid dissolved in 25 ml. of 60 percent dioxane solution was added 1.4 ml. of 1.5 N hydrochloric acid. The solution was heated on the steam bath for 15 minutes and stored at room temperature overnight. The solvent was removed by vacuum distillation at 35° at 0.1 mm and a white solid was obtained which weighed 275 mg. The bioautogram of this solid against a B. subtilis-seeded agar plate on a paper strip (What. No. 1) showed two biologically active spots in a system of n-butanol, ethanol and water (4:1:5) corresponding in $R_f$ values to starting material and cephalexin.

EXAMPLE 13

Pyrolysis of Sodium N-nitrosohetacillin sulfoxide and cleavage with dry hydrogen chloride A solution of 2.2 g. (0.00475 mole) of sodium 6-(2,2-dimethyl-3-nitroso-5-oxo-4-phenyl-1-imidazolidinyl)penicillanate sulfoxide in 100 ml. of tetramethylurea at 5° was treated with 0.32 g. (0.0025 mole) of dichloro-dimethylsilane. The mixture was stirred for 1 hour and 10 ml. of acetic anhydride was added. The mixture was then heated at 120° for 1 hour and the tetramethylurea was evaporated off at 0.1 mm at 35° to yield a dark brown residue. This was dissolved in 50 ml. of ethyl acetate and extracted two times with sodium bicarbonate solution. The basic extracts were combined, washed with ethyl acetate and finally with ether. The aqueous solution was acidified with 1:1 phosphoric acid and the product was extracted into ethyl acetate. The ethyl acetate was evaporated at 35° at 15 mm to a brown gum. The product was taken up in a minimal amount of ethyl acetate and precipitated with "Skellysolve B" to yield 250 mg. of N-nitrosohetacephalexin. The material was dissolved in 50 ml. of dioxane and dry hydrogen chloride gas was passed through for 5 minutes. The solution was stirred for 5 minutes and the solvent was removed under reduced pressure at 15 mm at 35° to give cephalexin as a solid which was slurried with ethyl acetate and then weighed 200 mg. The paper chromatogram (What. No. 1) against B. subtilis-seeded agar plate developed with n-butanol, ethanol and water 4:1:5 shows a zone of inhibition corresponding exactly in $R_f$ value to that of authentic cephalexin.

EXAMPLE 14

Sodium 6(2,2-dimethyl-3-nitroso-5-oxo-4-phenyl-1-imidazolidinyl) penicillanate sulfoxide To a solution of 7.6 g. (0.092 mole) of anhydrous sodium acetate in 30 ml. of water and 350 ml. of n-butanol was added 35 g. of 6-(2,2-dimethyl-3-nitroso-5-oxo-4-phenyl-1-imidazolidinyl)-penicillanic acid. The mixture was stirred and filtered. The solution was evaporated at 35° at 15 mm to one-third of its original volume. A total of 100 ml. of anhydrous n-butanol was added and the salt was collected and air dried. It was then dried at .1 mm over $P_2O_5$ to yield 29.8 g. Anal. Calcd. for $C_{19}H_{21}N_4O_6S \cdot H_2O$: C, 48.30; H, 4.92; N, 11.8. Found: C, 48.61; H, 5.17; N, 11.07.

EXAMPLE 15

7-(D-α-Aminophenylacetatamido)-3-methyl-3-cephem-4-carboxylic acid by hydrogen chloride cleavage of N-nitrosohetacephalexin To a solution of 2 g. (0.05 mole) of 7-(D-2,2-dimethyl-3-nitroso-5-oxo-4-phenyl-1-imidazolidinyl)-3-methyl-3-cephen-4-carboxylic acid dissolved in 50 ml. of dioxane was bubbled in dry hydrogen chloride gas for 5 minutes. The solution was stirred for 5 minutes and the solvent was removed at 30° at 15 mm. The residue was stirred with ethyl acetate and was collected to give 1.9 g. of crude product. The material was dissolved in dilute hydrochloric acid at pH 2.5 and treated with charcoal (Darko KB) for 5 minutes and the filtrate was adjusted to 4 with 10 percent sodium hydroxide. The water was evaporated at 40° at 15 mm to give 1.1 g. of the free amino acid. The infrared was consistent with the spectrum of authentic cephalexin. Residue NaCl 38.34%. The bioassay was 350 γ/mg. The chemical assay was 365 γ/mg.

EXAMPLE 16

Rearrangement to cephalexin of 6-(D-2,2-dimethyl-3-nitroso-5-oxo-4-phenyl-1imidazolidinyl)penicillanic acid sulfoxide using a mixed anhydride procedure The same procedure was followed as in Example 13 with the silyl ester using 6.5 g. (0.014 mole) of N-nitrosohetacillin sulfoxide sodium salt, 6 ml. of acetic anhydride and 1.18 g. (1.3 ml.) of acetyl chloride. There was isolated 2.4 g. (41.5 percent) of product. After treatment of this with dry hydrogen chloride in the usual way a total of 900 mg. cephalexin was isolated. A paper chromatogram (What.No. 1) against a B. subtilis-seed agar plate developed with n-butanol, ethanol and water 4:1:5 shows a zone of inhibition corresponding exactly in $R_f$ value to that of authentic cephalexin.

7-(D-2,2-Dimethyl-3-nitroso-5-oxo-4-phenyl-1-imidazolidinyl)-3-methyl-3-cephem-4-carboxylic acid A solution of 21 g. (0.0487 mole) of 7-(D-2,2-dimethyl-3-nitroso-5-oxo-4-phenyl-1-imidazolidinyl)penicillanic acid sulfoxide and 5 g. of p-toluenesulfonic acid (anhydrous) (TSA) in 500 ml. of tetramethylurea (TMU) was heated at 135° for 2 hr. with stirring. The solvent was removed at 0.1 mm at 40° to leave an oil which was dissolved in 250 ml. of ethyl acetate. The ethyl acetate was washed twice with 100 ml. portions of water and extracted with dilute sodium bicarbonate solution. The final pH was 6.7. The aqueous layer was separated and stirred with 100 ml. of ethyl acetate. The pH was adjusted to 2 with 1:1 $H_3PO_4$ and the aqueous solution was extracted 2X with ethyl acetate. The ethyl acetate was washed with water and azeotroped to an oil at 35° (15 mm). The residue was slurried with "Skellysolve B" and collected as an amorphous powder which weighed 10.0 g. The solids were suspended in 150 ml. of water and saturated sodium carbonate solution was added until all the material dissolved (final pH 7.5). A solution of 4 g. (0.011 mole) of dibenzylethylenediamine diacetate in 75 ml. of water was added and the mixture was stirred with 150 ml. of 4-methyl-2-pentanone in a two-phase system. The mixture was stirred for 1/2 hour at room temperature and the crystalline salt was collected, washed with water and finally with acetone and after air drying, weighed 7.1 g.; m.p. 150°-152° decomp.

Anal. Calcd for $C_{54}H_{60}N_{10}O_{10}S_2 \cdot 3H_2O$: C, 57.53; H, 5.90; N, 12.43.

Found: C, 57.54; H, 6.21; N, 12.71. 57.49 6.38

Ir (KBr) 3200–3600 cm$^{-1}$ (NRH$_2^+$); OH (water); 1760–1770

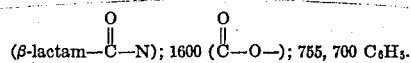

The 7.1 g. of N,N'-dibenzylethylenediammonium 7-(D-2,2-di-methyl-3-nitroso-5-oxo-4-phenyl-1-imidazolidinyl)-3-methyl-3-cephem-carboxylate was suspended in 50 ml. of 1:1 phosphoric acid and 150 ml. of water. The mixture was layered with 150 ml. of ethyl acetate and

EXAMPLE 17

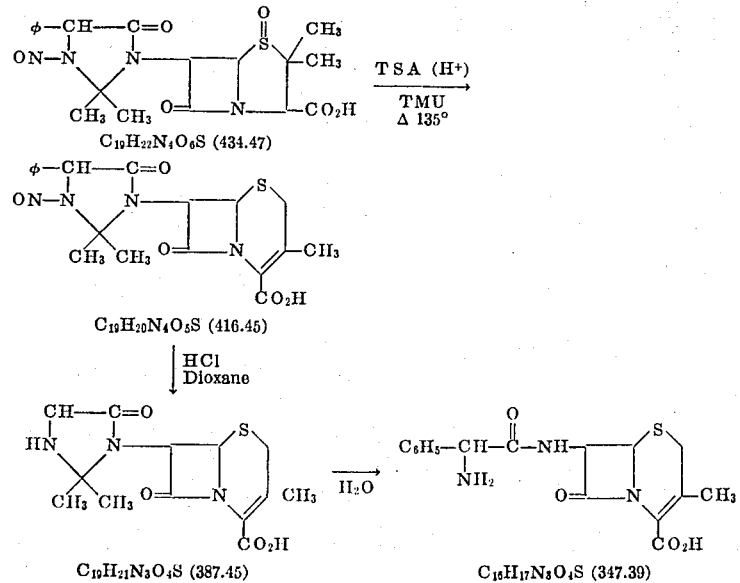

shaken vigorously until all the salt dissolved. The ethyl acetate was removed, washed with water and evaporated at 40° (15 mm) to a crystalline solid which weighed 3.1 g.; m.p. 175°–180° decomp. The ir and nmr spectra were identical with authentic N-nitrosohetacephalexin.

7-(D-α-Aminophenylacetamido)-3-methyl-3-cephem-4-carboxylic acid (cephalexin)

To 1 g. (0.0025 mole) of 7-(D-2,2-dimethyl-3-nitroso-5-oxo-4-phenyl-1-imidazolidinyl)-3-methyl-3-cephem-4-carboxylic acid in 50 ml. of dioxane (purified by running through a column of aluminum oxide) was added dry hydrogen chloride for 5 min. at room temperature. The solution was evaporated at 30° (15 mm) to a gum which was slurried with ethyl acetate and collected. The solid was then dissolved in water (50 ml.) and made basic with aqueous sodium bicarbonate solution to pH 4.8. The mixture was filtered and the filtrate was evaporated at 30° (15 mm) to a glass which was further dried by azeotropic distillation with ethyl acetate. The yield of the sodium salt was 600 mg. The nmr and ir spectra were identical with the spectra of authentic sodium hetacephalexin. About 200 mg of the sodium salt was dissolved in a minimum amount of water (ca 1 ml.) acidified to pH 4–5 with acetic acid and stored at 5° overnight. The crystalline solid was collected, washed with water and finally with acetone to yield, after drying at Rt (15 mm) over $P_2O_5$, 60 mg of crystalline cephalexin; m.p. 195° decomp. The nmr and ir were identical with authentic cephalexin.

We claim:
1. 6-(D-2,2-Dimethyl-3-nitroso-5-oxo-4-phenyl-1-imidazolidinyl)penicillanic acid.
2. 6-(D-2,2-Dimethyl-3-nitroso-5-oxo-4-phenyl-1-imidazolidinyl)penicillanic acid sulfoxide.
3. 7-(D-2,2-Dimethyl-3-nitroso-5-oxo-4-phenyl-1-imidazolidinyl)-3-methyl-3-cephem-4-carboxylic acid.
4. 6-(D-2,2-Dimethyl-3-formyl-5-oxo-4-phenyl-1 imidazolidinyl)penicillanic acid.
5. 6-(D-2,2-Dimethyl-3-formyl-5-oxo-4-phenyl-1 imidazolidinyl)penicillanic acid sulfoxide.
6. 7-(D-2,2-Dimethyl-3-formyl-5-oxo-4-phenyl-1-imidazolidinyl)-3-methyl-3-cephem-4-carboxylic acid.
7. 7-(D-2,2-Dimethyl-5-oxo-4-phenyl-1-imidazolidinyl)-3-methyl-3-cephem-4-carboxylic acid.
8. The sodium salt of the acid of claim 7.

* * * * *